May 22, 1945. E. A. J. TUNNICLIFFE 2,376,836
DISTANCE MEASURING DEVICE
Filed Feb. 11, 1942 3 Sheets-Sheet 1
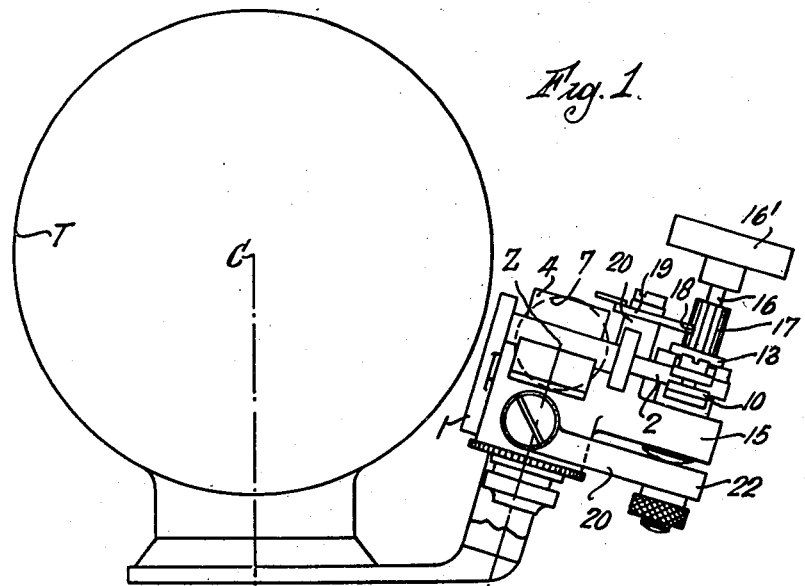
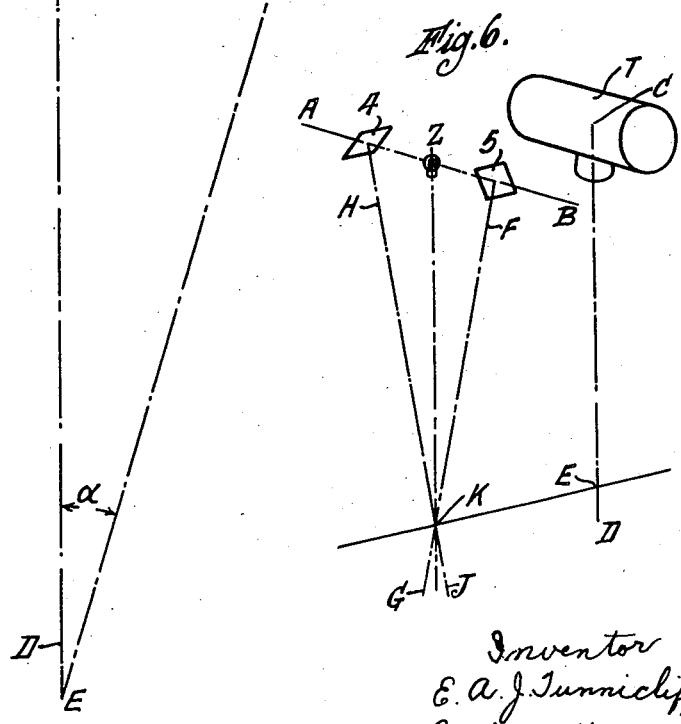
Inventor
E. A. J. Tunnicliffe
By his attorneys,
Baldwin & Wight May 22, 1945. E. A. J. TUNNICLIFFE 2,376,836
DISTANCE MEASURING DEVICE
Filed Feb. 11, 1942 3 Sheets-Sheet 2
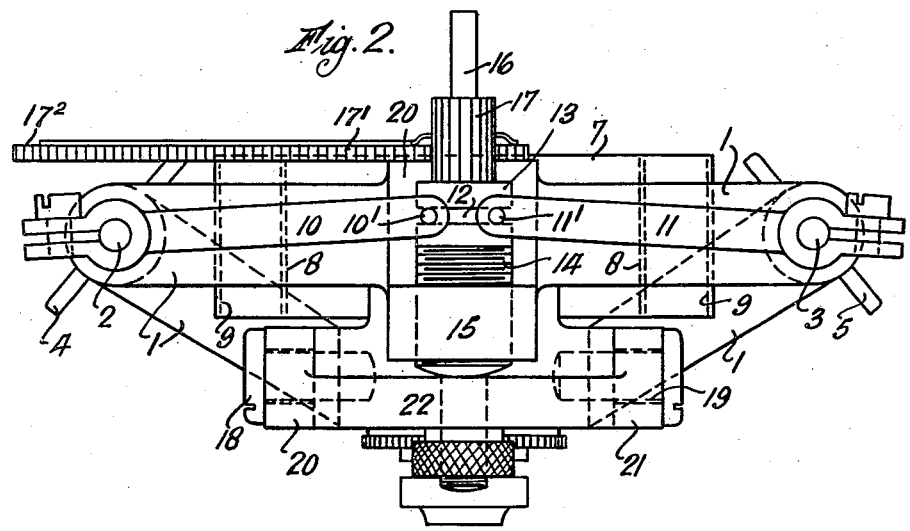
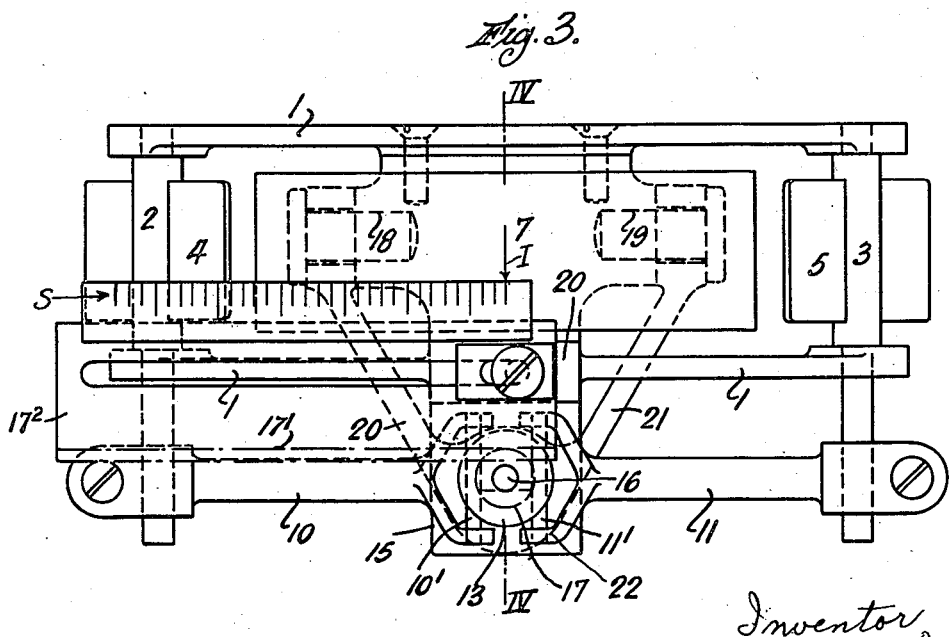

May 22, 1945.  E. A. J. TUNNICLIFFE  2,376,836
DISTANCE MEASURING DEVICE
Filed Feb. 11, 1942  3 Sheets-Sheet 3
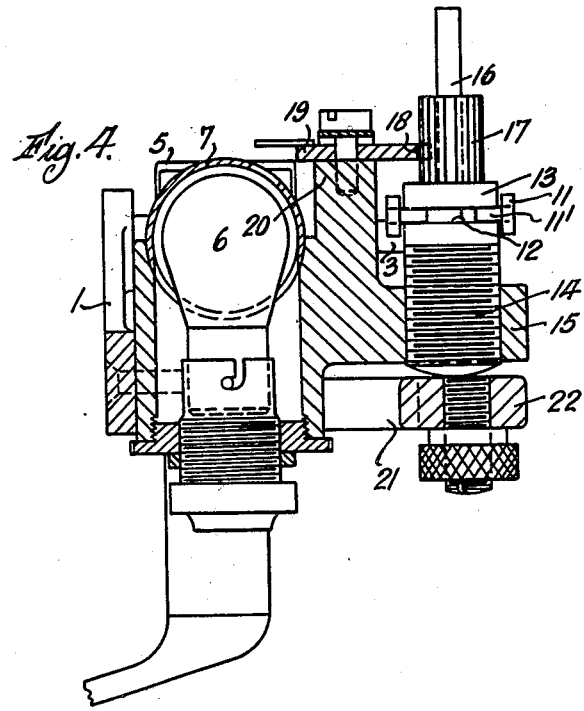
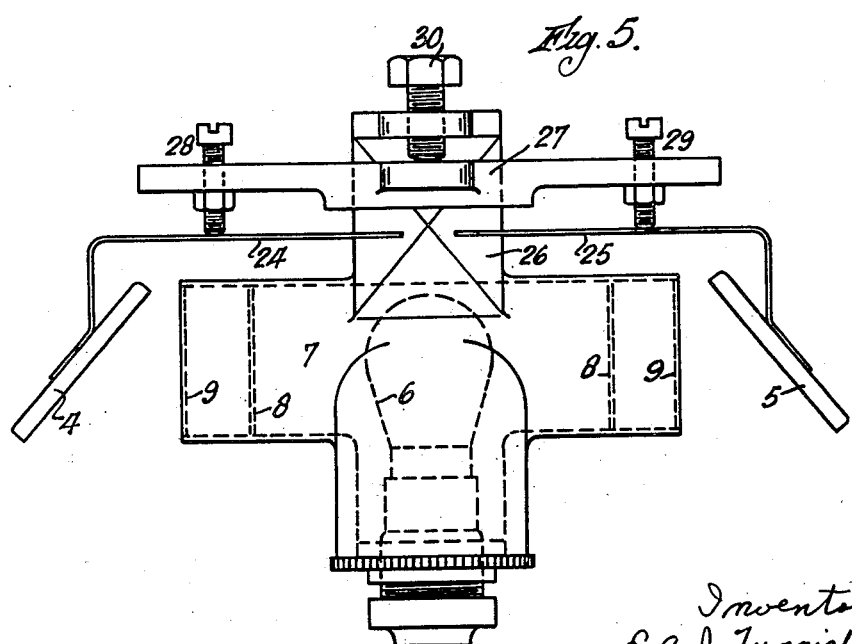

Patented May 22, 1945

2,376,836

UNITED STATES PATENT OFFICE 2,376,836

DISTANCE MEASURING DEVICE

Edward Albert James Tunnicliffe,
Thorpe Bay, England

Application February 11, 1942, Serial No. 430,468
In Great Britain August 31, 1940

3 Claims. (Cl. 88—1)

This invention relates to a device for measuring distances and particularly for measuring the distance between the target of an X-ray tube and the film.

As is well known, this distance is one of the variables which requires frequent and precise adjustment in X-ray work and heretofore measurement of such distance has been effected by means of a rule or some equivalent device.

The main object of the present invention is to provide an improved device by means of which the setting or measurement of the distance referred to can be ascertained and adjusted easily and accurately.

The present invention utilizes an optical system which will project two beams of light and adjustable means is provided by which the angle between the two beams can be adjusted; hence referring to the base line between the points of origin of the beams the distance from this base to the point at which the beams (by reason of their relative angle) intersect or have some other predetermined relation will be a function of the adjustment. Thus by arranging the base line in a known relationship with respect to the target of the X-ray tube and by projecting the beams on to the film support (or some other part in a fixed relation to that support) so as to produce a determined relationship between the projection of the two beams, the distance between the target and the film will be a function of the angle of adjustment. It follows that by suitably calibrating the mechanism for effecting the adjustment of the angle between the two beams, the linear distance can be read directly. Usually the optical system would include two mirrors or totally reflecting prisms and the adjusting means would operate to vary the relative angle between the two mirrors or prisms.

In this particular case the base line of the system would be afforded between the two mirrors and these two mirrors would be arranged in the known relationship with respect to the target of the X-ray tube.

In the case in which mirrors or totally reflecting prisms are employed, the relative angle between the two mirrors can be adjusted either by adjusting both mirrors simultaneously or by adjusting one mirror and leaving the other fixed.

The adjustment may be effected by screw mechanism; for example when both mirrors are to be adjusted simultaneously a rod having right and left handed screw threaded parts can be employed the rod having a dial calibrated in terms of distance.

To ensure concentrated or sharply defined beams, the light can be projected through lens systems.

In most cases the light source would be provided by an electric lamp light rays from which pass to the mirrors for reflection by them.

In most cases also each beam of light will pass through a screen, the two screens having say rectilinear slits at right angles so that where the two beams intersect a "cross" projection image will be formed.

The invention is illustrated in the accompanying drawings in which Figures 1–4 illustrate one form of construction, and Figure 5 is a modified form of construction, Figure 1 being an end elevation showing a device according to this invention applied to an X-ray tube, Figures 2 and 3 respectively side elevation and plan of the device itself to a larger scale, and Figure 4 a section on the line IV—IV Figure 3 while Figure 5 is a front elevation. Figure 6 is a diagrammatic view.

Referring firstly to Figures 1–4 and particularly Figures 2, 3 and 4, the device comprises a frame 1 in which are supported spindles 2, 3 carrying optical reflectors 4, 5, these reflectors being in the path of a beam of light issuing from a lamp 6 in a lamp housing 7 on the frame 1, the beam issuing through narrow slots in discs 8, 9 at the two ends of the housing.

The spindles 2, 3 have arms 10, 11 clamped to them and the outer free ends of these arms are provided with pins 10', 11' engaged in a peripheral groove 12 in an adjusting member 13 which is screwed at 14 and engaged in a screwed hole in a lug 15 on the frame 1; the actuating member 13 is extended at 16 to receive an operating handle 16'.

It will be apparent that the beam of light passing from the two ends of the housing 7 to the two reflectors 4, 5, will be deflected in accordance with optical laws and, as the reflectors are directed towards one another, the reflected beams will intersect at some point depending on the angle at which the reflectors are set. Hence, by rotating the operating member 13, the screw thread 14 causes it to move axially in or out of the lug 15 and in this way the arms 10, 11 and the reflectors 4, 5 to which they are connected through the spindles 2, 3, will be caused to rock to vary the angular relationship of the reflectors 4, 5 and consequently the point at which the reflected beams will intersect. In other words, regarding the line A—B joining the axes of the two spindles 2, 3, as a datum, the distance measured from this datum to the point of intersection of the beams can be varied by rotation of the operating member 13 and thus the setting of this operating member is a function of this distance so that by suitable calibration the distance can be indicated by the position of the actuating member 13.

If now the device be fitted to an X-ray equipment so that the datum line referred to is in some fixed relationship to the target of the tube and the beams are reflected on to the film support (or some part in a fixed relationship to that support), then by operating the actuating member 13 so that the beams intersect (or have some other predetermined relationship) on the support, the position of the actuating member will indicate the distance between the target of the X-ray tube and the film holder. This will be clear from Figure 6 in which the datum line indicated at A, B is at the same level as the target of the X-ray tube T, the central ray from which is denoted at C, D and is focussed on the film holder at a point E; in this figure the reflected beams of light are indicated at F—G, H, J and intersect at K.

It will be apparent that (for any given distance between the target of the X-ray tube and the film holder) there is a given angular setting of the reflectors 4, 5 which will cause the point of intersection K of the reflected beams F—G, H—J to fall on the holder and hence the setting of the reflectors (or more precisely of its operating member) is a measure of the distance KZ from the datum line A, B to the holder and hence of the distance CE.

In Figures 1-4 the extension 16 of the operating member 13 is provided with gear teeth 17 in mesh with a rack 17' on a plate 17² which is slidable on the frame 20, the plate having on it a scale S co-operating with a pointer 1 so that when the operating member 13 is operated to adjust the angular setting of the reflectors 4, 5 the scale indicates directly the distance C, E.

It is necessary for the device to be located to one side of the X-ray tube and while (as is seen in Figure 6) it will in some cases be sufficient for the reflected rays FG, HJ to be reflected in a plane parallel with the central ray from the X-ray tube, it would in other cases be preferable to arrange the reflected beams to intersect at the actual zone E at which the central ray C, D is focussed on the film support and this will necessitate the reflected beams being in a plane at an angle to the central ray of the X-ray tube. Such an arrangement is shown in Figure 1 where the line EZ represents the plane containing the reflected beams FG, HJ from the reflectors. As will be seen from this figure the plane EZ makes an angle $\alpha$ with the central ray CD of the tube and obviously this angle will vary with the distance CE between the film support and the target of the tube. In order to compensate for this change of angle with change of the distance CE, the following arrangement is provided; the frame 1 (see Figures 2, 3 and 4) instead of being secured direct to the X-ray tube T is pivotally mounted on pivot pins 18, 19, carried by arms 20, 21 extending from a main supporting bracket 22 itself secured to the X-ray tube (or its support) so that the frame 1 is free to rock on the pivots. The end of the screwed operating member 13 reacts against the bracket 22 as seen in Figure 4. When now the operating member 13 is rotated, not only are the arms 10, 11 rocked but the end of it is caused to be projected more or less beyond the lug 15 in which the operating member is screwed and by reaction with the bracket 22 the frame is caused to rock about its pivots 18, 19. As will be seen from Figure 1 this rocking movement causes the reflectors 4, 5 to be rocked together so that the angle $\alpha$ of the plane EZ containing the reflected beams is correspondingly changed in such manner that the point K of intersection (for any given setting) will fall on the focussing point of the central ray of the X-ray tube.

A modified construction adapted for cheaper production costs than the construction shown in Figures 1-4 is shown in Figure 5; in this figure, the reflectors 4, 5 are mounted at the outer ends of spring arms 24, 25 which are anchored at their inner ends in a fixed block 26 on which is slidably mounted a yoke piece 27 the arms of which have abutments 28, 29 against which the spring arms 24, 25 are held by their resiliency. The block 26 is provided with an operating screw 30 which bears against the yoke piece 27 so that by operating the screw the arms 24, 25 are caused to be flexed and in this way to change the angle of the reflectors, the whole operating in the manner described with reference to Figures 1-4 to change the point of intersection K of the beams reflected by the mirrors from the lamp 6 in the housing 7. The abutments 28, 29 are preferably as shown in the form of set screws so that the setting of the arms 24, 25 can be adjusted together and individually.

What I claim is:

1. In X-ray apparatus, a carrier for an X-ray tube, a carrier for a surface sensitive to X-rays, and a device for measuring the distance between the two carriers, the said device comprising a main support, a second support pivotally mounted on said main support, two optical reflecting devices mounted on said second support for relative angular adjustment about axes which are transverse to the axis of the pivotal mounting of the second support on the main support, a nut member on the second support, a screw threaded adjusting member engaging said nut member and abutting the main support, connections between the threaded member and the two reflecting devices such that longitudinal movement of the threaded member is transmitted to the reflecting devices, and a source of light for illuminating the reflecting devices, the whole arrangement being such that rotation of the adjusting member effects relative angular adjustment of the two devices on the second support and also angular adjustment of the second support on the main support so that the beams of light projected by the two reflecting devices intersect at a variable distance from the target of the tube and always along the same straight line representative of the central ray emanating from the tube towards the carrier for the sensitive means.

2. In an X-ray apparatus for measuring the distance from the tube to the target, a main support for unitary mounting with the X-ray tube, a second support, pivot means for mounting the said second support on said main support, two optical reflecting devices mounted on said second support for relative angular adjustment about axes transverse to the axis of said pivot means, a screw-threaded element on the second support fixed with respect to the said pivot means, a screw-threaded adjusting member engaging said element and abutting the main support, connections between the screw-threaded member and the two reflecting devices whereby longitudinal movement of the screw-threaded member angularly adjusts the reflecting devices and the source of light for projecting a beam of light on the reflecting devices, the whole arrangement being such that rotation of the screw-threaded adjusting member effects a relative angular adjustment of the two devices on the second support and also angular adjustment of the second support on the main support, so that the beams of light projected by the two reflecting devices intersect at a variable distance from the target of the tube and always along the same straight line representative of the central ray emanating from the tube towards the target, and scale means connected to the threaded adjusting member for indicating the distance from X-ray tube to the target.

3. In distance measuring apparatus, a main support, a second support, pivot means mounting said second support on said main support, two optical reflecting devices mounted on said second support for relative angular adjustment about axes transverse to the axis of said pivot means, an adjusting member, means mounting said adjusting member for longitudinal adjustment on the second support, said adjusting member and last-mentioned means being in fixed relation relative to the said pivot means and in coacting engagement with the main support, connections between said adjusting member and the two reflecting devices, whereby longitudinal movement of the adjusting member angularly adjusts the reflecting device, and a source of light for projecting a beam of light on the reflecting device, the whole arrangement being such that rotation of the adjusting member effects relative angular adjustment of the reflecting device on the second support and also angular adjustment of the second support on said pivot means relatively to the main support so that beams of light projected by the two reflecting devices intersect at a variable distance along a straight line common thereto, and scale means connected to the threaded adjusting member for indicating the distance measured.

EDWARD ALBERT
JAMES TUNNICLIFFE.